W. H. THIEMER.
UNIVERSAL JOINT.
APPLICATION FILED JUNE 1, 1920.

1,378,986.

Patented May 24, 1921.
2 SHEETS—SHEET 1.

Inventor.
William H. Thiemer
By Hull, Smith, Brock & West
Attys.

W. H. THIEMER.
UNIVERSAL JOINT.
APPLICATION FILED JUNE 1, 1920.
1,378,986.
Patented May 24, 1921.
2 SHEETS—SHEET 2.
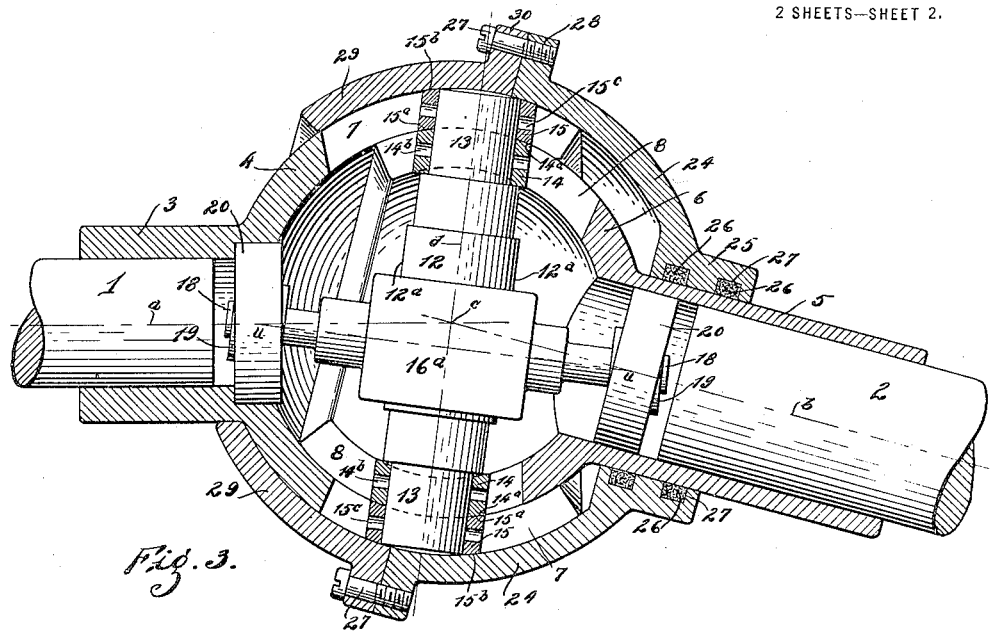
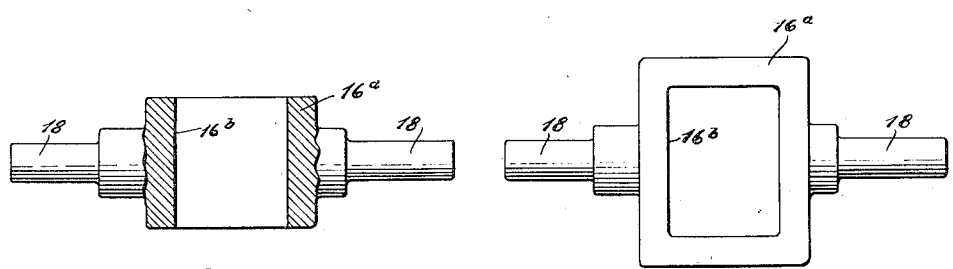
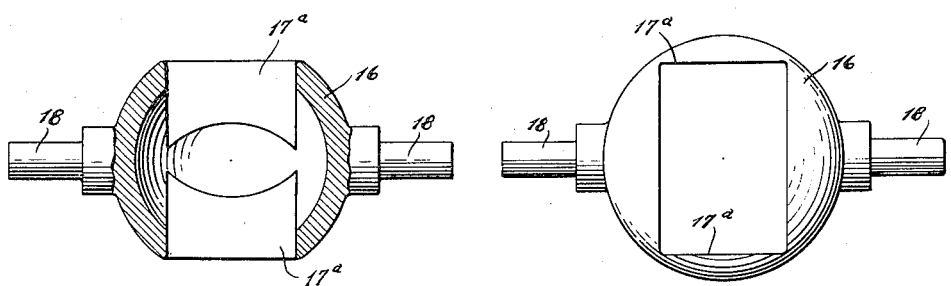
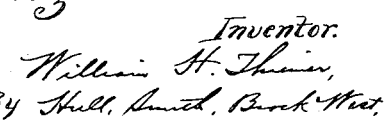

UNITED STATES PATENT OFFICE.

WILLIAM H. THIEMER, OF CLEVELAND, OHIO, ASSIGNOR TO THE PARAGON MACHINE TOOL & MANUFACTURING COMPANY, OF CLEVELAND, OHIO, A CORPORATION OF OHIO.

UNIVERSAL JOINT.

1,378,986.

Specification of Letters Patent.

Patented May 24, 1921.

Application filed June 1, 1920. Serial No. 385,487.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its general object to provide a construction of such joints that will enable a driven shaft, arranged at an angle to a driving shaft, to be driven constantly at the same speed as the latter shaft.

As is well known, in the ordinary type of metallic or rigid universal joint, where the driven shaft is arranged at an angle with respect to the driving shaft, the speed of the driven shaft varies through two maxima and minima during each rotation thereof. This change in velocity is rapid, occurring during each quarter revolution of the shaft, where the driven shaft is arranged at an engle of 10° with respect to the driving or propeller shaft and the latter shaft is driven at a speed of 500 R. P. M., the maximum velocity of the driven shaft will be 508 and the minimum 492 R. P. M., making a variation of 16 R. P. M. during each quarter revolution. As the angle between the propeller or driving shaft and the driven shaft increases, the variation in speed is correspondingly increased. In the case of automobile transmission, this results, not only in increased friction upon the bearings of the universal joint, but in the imposition of severe strains upon the gears with which the driven shaft is connected and upon the fly wheel upon the propeller shaft.

Figure 1:
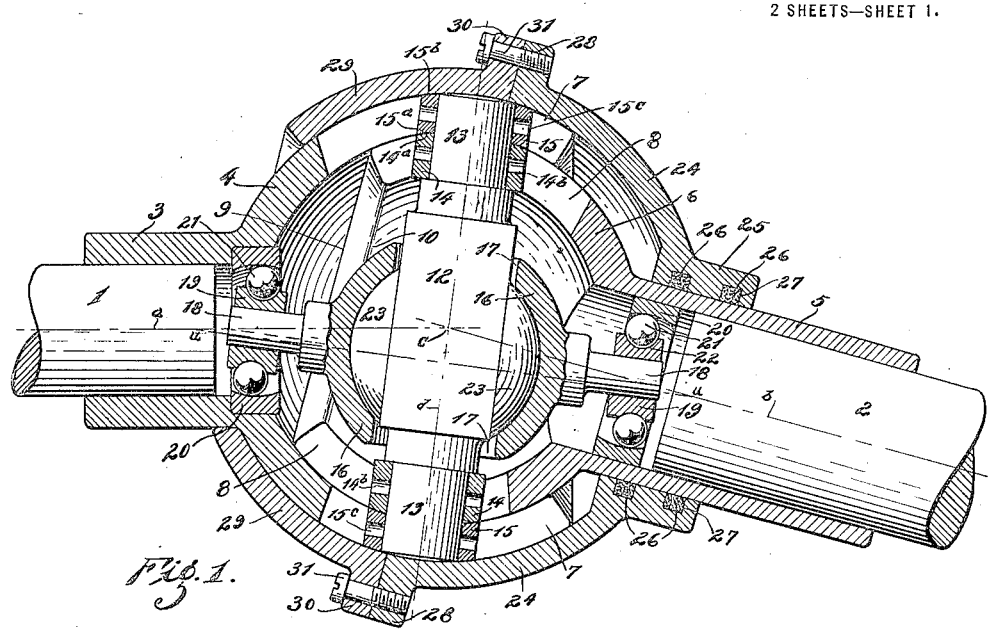
Figure 2:
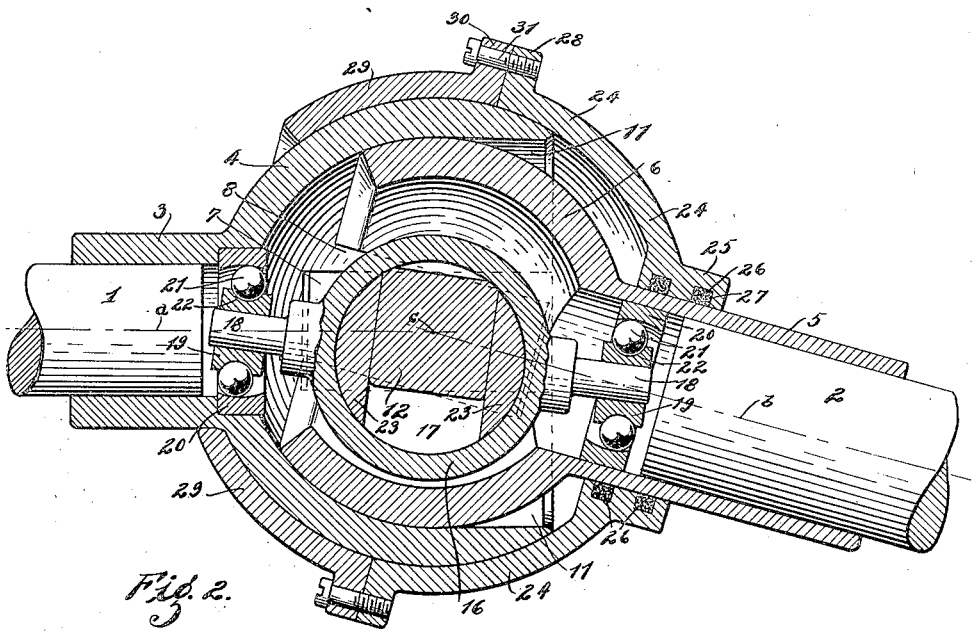

By my construction, I am enabled to couple two angularly disposed shafts by a metallic or rigid universal joint and at the same time to maintain a speed in the driven shaft which is equal at all times to that of the driving or propeller shaft. I accomplish these results in and through the construction shown in the drawings forming part hereof, wherein Figure 1 represents a central longitudinal view taken through two angularly disposed shafts connected by my joint; Fig. 2 a similar view showing the positions of the parts at the end of a quarter revolution of the shafts; Fig. 3 a view similar to Fig. 1 of a modified form of the invention, the bearings and the hub upon the driver being shown in elevation; Fig. 4 a detail in sectional elevation of the hub and pin construction employed in Figs. 1 and 2; Fig. 5 a similar view taken substantially at right angles to Fig. 4 and showing the shoes in place; Fig. 6 a detail in sectional elevation and Fig. 7 a detail in plan of the hub and pin construction shown in Fig. 3.

Describing the parts by reference characters, 1 denotes the driving or propeller shaft and 2 the driven shaft, the two shafts being shown as having their axes $a$ and $b$ disposed at an angle of 15° with each other. Seated upon and secured to the shaft 1 is a hub 3, having a cup 4, the inner and outer surfaces of which are spherical and concentric with the point of intersection $c$ of the axes $a$ and $b$. Mounted on the shaft 2 is an elongated hub 5 having a cup 6, the inner and outer surfaces of which (with the exceptions to be noted hereinafter) are formed each as the segment of a sphere concentric with the point $c$. The cup 4 is provided with a pair of diametrically opposed slots 7 extending inwardly from the outer end thereof and the cup 6 is provided with a pair of diametrically opposed slots 8 extending inwardly from the outer end thereof. In order to permit the cup 6 to be assembled within the cup 4, its outer surface is flattened at 9, midway between the slots 8, the inner surface also being flattened at 10, to preserve the thickness of the cup wall. In order to permit the cup 6 to be received within the cup 4, the metal on the inside of the outer end of said cup is cut away, as indicated at 11, in planes parallel to the axis $a$, midway between the slots 7. This will allow the cup 6 to be inserted within the cup 4 with the rounded or spherical parts thereof fitting within the flattened parts 11. When the cup 6 has once been entered, it may be given a quarter rotation, bringing the slots 8 into register with the slots 7. The cups serve as coupling members between the shafts 1 and 2.

The cups 6 and 4 are connected by a driver, indicated generally at 12, and having pins or trunnions 13. Each pin is mounted within a pair of square or rectangular bushing members, the inner member being indicated at 14 and the outer member being indicated at 15. Each inner member extends outwardly upon its trunnion pin as far as the outer edge of the slot 8, the outer end 14ª forming part of a spherical surface coinciding with the outer spherical surface of the cup 6. The inner end 15ª of the outer bushing member is also a portion of a spherical surface coinciding with the outer surface of the cup 6, and the outer end 15ᵇ of the outer bushing member 15 is formed as a spherical surface coinciding with the exterior surface of the cup 4 as well as the interior surface of the spherical casing (to be described hereinafter) which partially incloses the cups 4 and 6. Each bushing member is provided with ports, 14ᵇ and 15ᶜ, to which lubricant from within the casing (to be described hereinafter) may be supplied by centrifugal action to the trunnions 13.

Mounted upon the driver 12 is a spherical hub 16 having opposed openings 17 for the reception of the central squared portion of the driver 12. The openings 17 are elongated in the direction of the driving movement of the driver 12, by broaching out the metal, as indicated at 17ª, Fig. 4. The hub 16 carries a pair of pins or trunnions 18 each provided with an inner raceway 19 of an annular ball bearing, the outer raceway 20 for each bearing being mounted within a seat provided within the inner ends of the hubs 3 and 5, respectively, whereby the outer raceways will revolve with the shafts 1 and 2. The inner surface of each outer raceway is spherical, being concentric with the axis of its pin 18. Between the raceways are balls 21 which are seated within the annular groove 22 in the inner raceway.

Within the hub 16 and on opposite faces of the driver 12 are shoes 23, each shoe having a flat face adapted to slide upon the flat face of the driver which is presented toward a pin 18, the two shoes being diametrically opposed, and each having a spherical outer surface conforming to the interior of the hub.

With the parts constructed and arranged as described, when power is applied to the shaft 1, it will be transmitted to the cup 4, bushings 15, trunnions 13, bushings 14 and to the cup 6. During the rotation of the shaft 1, the axis $d$ of the driver will be always at right angles to the line $u$—$u$ which connects the axes $a$ and $b$ at points equidistant from their point of intersection $c$ and will always bisect the exterior and interior angles of the axes $a$ and $b$. Through the thrust exerted on the hub 16 and the sliding shoes upon the driver 12, through the pins 18 and bearings 19—22, the driver will be constrained to follow the path of least resistance just described, with the result that the speed of the shaft 2 will always be equal to that of the shaft 1, and the pressure exerted upon the bearing parts will be equalized.

The overlapping portions of the cups 4 and 6 and the slots and the various parts therewithin will be protected by a casing comprising a hemispherical cup member 24 having at one end a hub 25 adapted to surround the hub 5 and provided with packing rings 26 seated in annular grooves 27. The outer ends of the cup member 24 is flanged, as indicated at 28, whereby it may be connected to a second cup member 29 as by means of a flange 30 on the latter which is connected to the flange 28 by bolts 31. The inner surface of the casing is spherical and is adapted to fit over the outer surface of the cup 4. The casing provides a receptacle for lubricant for the parts therewithin, and also serves to protect such parts from the access of dust.

In Fig. 3 there is shown a modification of my invention, wherein the parts 1—15ᶜ, 18—22 and 24—31 are identical with the correspondingly numbered parts in Figs. 1 and 2. The hub 16ª, however, is rectangular, being elongated in the direction of movement of the driver. The inner faces 16ᵇ are adapted to slide upon the opposed faces 12ª of the driver. This allows for freedom of movement of the driver in its turning movement but always maintains the driver at right angles to the line $u$—$u$ and with its axis always bisecting the exterior and interior angles of the axes $a$ and $b$, accomplishing the same purpose as the construction shown in Figs. 1, 2, 4 and 5.

Having thus described my invention, what I claim is:

1. The combination, with a drive shaft and a driven shaft arranged angularly with respect thereto, of coupling members carried by the proximate ends of said shafts, respectively, a driver, a rocking connection between each end of said driver and said members, a hub mounted on said driver and movable with respect thereto in the direction of rotation of said driver, and means coöperating with said hub and adapted to engage opposite sides of said driver thereby to compel the latter to follow a predetermined path during its rotation.

2. The combination, with a drive shaft, and a driven shaft arranged angularly with respect thereto, of coupling members carried by the proximate ends of said shafts, respectively, a driver, a rocking connection between each end of said driver and said members, a hub mounted on the central portion of said driver and movable with respect thereto in the direction of rotation of said driver and adapted to exert a thrust upon opposed faces of said driver parallel with such direction of rotation, pins carried by opposite sides of said hub, and antifriction thrust bearings operatively connected to said shafts, respectively, and each coöperating with one of said pins.

3. The combination, with a drive shaft and a driven shaft arranged angularly with respect thereto, of coupling members carried by the proximate ends of said shafts, respectively, a driver, a rocking connection between each end of said driver and said members, a hub surrounding the central portion of said driver and movable with respect thereto in the direction of rotation of said driver, the said driver having a pair of opposed faces parallel with the direction of rotation thereof, the interior of said hub which is presented toward said faces being concave, shoes each having a convex outer surface adapted to coöperate with a concave surface of said hub and each having a flat face adapted to coöperate with one of the two parallel faces of the driver, pins extending in opposite directions from said hub and means operatively connected with each shaft and adapted to exert a thrust upon a pin on said hub.

4. The combination, with a drive shaft and a driven shaft arranged angularly with respect thereto, of coupling members carried by the proximate ends of said shafts, respectively, a driver, a rocking connection between each end of said driver and said members, a hub surrounding the central portion of said driver and movable with respect thereto in the direction of rotation of said driver, the said driver having a pair of opposed faces parallel with the direction of rotation thereof, the interior of said hub which is presented toward said faces being concave, shoes each having a convex outer surface adapted to coöperate with a concave surface of said hub and each having a flat face adapted to coöperate with one of the two parallel faces of the driver, pins extending in opposite directions from said hub, and an anti-friction bearing operatively carried by each shaft and each coöperating with a pin to exercise a thrust thereupon, and upon a shoe within said hub.

5. The combination, with a drive shaft and a driven shaft arranged angularly with respect thereto, of coupling members carried by the proximate ends of said shafts, respectively, a driver, a rocking connection between each end of said driver and said member, a hub mounted on the central portion of said driver and movable with respect thereto in the direction of rotation of said driver, shoes within said hub and adapted to engage and slide upon opposed faces of said driver parallel with such direction of rotation, and means coöperating with said hub for exerting a thrust upon said shoes thereby to force the said driver to follow a predetermined path during its rotation.

In testimony whereof, I hereunto affix my signature.

WILLIAM H. THIEMER.